(12) United States Patent
Hollenbeck et al.

(10) Patent No.: US 9,270,212 B2
(45) Date of Patent: Feb. 23, 2016

(54) SYSTEM FOR SELECTING AN OUTPUT SPEED FOR AN ELECTRIC MOTOR

(71) Applicant: Merkle-Korff Industries, Inc., Elk Grove Village, IL (US)

(72) Inventors: Robert Hollenbeck, Fort Wayne, IN (US); Bruce Ley, Ossian, IN (US); Trevor Perdue, Fort Wayne, IN (US); Bart Long, Fort Wayne, IN (US); Justin Mumaw, Fort Wayne, IN (US)

(73) Assignee: Merkle-Korff Industries, Inc., Elk Grove Village, IL (US)

( * ) Notice: Subject to any disclaimer, the term of this patent is extended or adjusted under 35 U.S.C. 154(b) by 182 days.

(21) Appl. No.: 14/204,648

(22) Filed: Mar. 11, 2014

(65) Prior Publication Data
US 2014/0265984 A1    Sep. 18, 2014

Related U.S. Application Data

(60) Provisional application No. 61/777,492, filed on Mar. 12, 2013.

(51) Int. Cl.
*H02P 1/00* (2006.01)
*H02P 6/08* (2006.01)

(52) U.S. Cl.
CPC ..................................... *H02P 6/08* (2013.01)

(58) Field of Classification Search
CPC .................... H02P 2005/30; H02P 2007/0088; H02P 2007/01; H02P 7/063; H02P 7/20; H02P 2007/56
USPC ......................................................... 318/490
See application file for complete search history.

(56) References Cited

U.S. PATENT DOCUMENTS

| | | | |
|---|---|---|---|
| 4,019,106 A * | 4/1977 | Van Doren | H02P 7/298 318/252 |
| 5,945,800 A * | 8/1999 | Chen | H02P 7/10 318/696 |
| 6,243,532 B1 | 6/2001 | Wacker et al. | |
| 6,333,610 B1 | 12/2001 | Meschik et al. | |
| 7,643,318 B2 | 1/2010 | Wagoner | |
| 7,777,442 B2 | 8/2010 | Martins | |
| 7,781,996 B2 | 8/2010 | Tajima | |
| 7,847,507 B2 | 12/2010 | Wagoner | |
| 8,324,845 B2 * | 12/2012 | Suzuki | B25F 5/00 318/139 |

* cited by examiner

*Primary Examiner* — Eduardo Colon Santana
*Assistant Examiner* — Bickey Dhakal
(74) *Attorney, Agent, or Firm* — Maginot, Moore & Beck, LLP (57) ABSTRACT

An electric motor has a control circuit that enables an operational speed of the electric motor to be selected with reference to multiple ranges of speeds and the input voltage to the motor. Switching between speed ranges occurs in response to activation of a switch or in response to expiration of a time period set by a selector switch.

16 Claims, 8 Drawing Sheets

| State | Action | Result |
|---|---|---|
| HIGH | Speed Toggle Press | Change to LOW |
| HIGH | "T" Hours Pass (or 1 Hr for Lo Mode) | Change to LOW |
| HIGH | Remove power | Change to OFF |
| HIGH | 24 Hour Reset Occurs | RESET & Start in HIGH |
| LOW | Speed Toggle Press | Change to HIGH |
| LOW | Remove power | Change to OFF |
| LOW | 24 Hour Reset Occurs | RESET & Change to HIGH |
| OFF | Apply power | Change to HIGH |

| State | Definition |
|---|---|
| HIGH | Speed determined by high speed selection dial and input voltage |
| LOW | Speed determined by low speed selection dial and input voltage |
| OFF | No power applied to motor/control |

SYSTEM FOR SELECTING AN OUTPUT SPEED FOR AN ELECTRIC MOTOR

CLAIM OF PRIORITY

This application claims priority from provisional application Ser. No. 61/777,492 entitled "System And Method For Selectable Speed Electric Motor," which was filed on Mar. 12, 2013. That application is expressly incorporated in its entirety in this application by reference.

BACKGROUND

Electric motors are used in a variety of applications. Some of these applications include the pumping of fluent, which in some instances is water through a swimming pool or the like. Most electric motors in these applications either operate at a constant speed or operate over a range of speeds for a single input voltage to the motor. These motors, however, can be used in variety of environments in which the input voltage can vary. A motor that can accommodate different input voltages and adjust the speed of the motor accordingly would be beneficial.

SUMMARY

A system having an electric motor that adjusts its output speed with reference to its input voltage has been developed. The system includes an electric motor, a housing mounted to the electric motor, and a control circuit within the housing, the control circuit being configured to regulate a speed of the electric motor. The control circuit comprises: a voltage sensor configured to identify an input voltage for operating an electric motor, a first selector configured to generate a first electrical signal that identifies a first speed for a first input voltage and a second speed for a second input voltage from a first range of speeds for operation of the electric motor, a second selector configured to generate a second electrical signal that identifies a third speed for the first input voltage and a fourth speed for the second input voltage from a second range of speeds for operation of the electric motor, each speed in the second range of speeds being greater than each speed in the first range of speeds, a motor driver circuit configured to generate waveforms to regulate the speed of the electrical motor, and a controller operatively connected to the first selector, the second selector, the voltage sensor, and the motor driver circuit, the controller being configured to select one of the first speed, the second speed, the third speed, and the fourth speed for operation of the electrical motor with reference to the identified input voltage, and to transmit data to the motor driver circuit that identifies the selected speed for the operation of the electric motor.

A control circuit for operating an electric motor to adjust the output speed of its output speed has been developed. The control circuit includes a voltage sensor configured to identify an input voltage for operating an electric motor, a first selector configured to generate a first electrical signal that identifies a first speed for a first input voltage and a second speed for a second input voltage from a first range of speeds for operation of the electric motor, a second selector configured to generate a second electrical signal that identifies a third speed for the first input voltage and a fourth speed for the second input voltage from a second range of speeds for operation of the electric motor, each speed in the second range of speeds being greater than each speed in the first range of speeds, a motor driver circuit configured to generate waveforms to regulate the speed of the electrical motor, and a controller operatively connected to the first selector, the second selector, the voltage sensor, and the motor driver circuit, the controller being configured to select one of the first speed, the second speed, the third speed, and the fourth speed for operation of the electrical motor with reference to the identified input voltage, and to transmit data to the motor driver circuit that identifies the selected speed for the operation of the electric motor.

DETAILED DESCRIPTION

Embodiments of the invention presented below describe a variable speed electric motor having speed selection controls. In these embodiments, the electric motor includes controls for manual selection of shaft rotation speed (e.g., in revolutions-per-minute (RPM)), as well as an associated timer and a high/low speed toggle switch. In one embodiment, actuators enable the selection of an output speed of an electric motor with a selection of numerical speed level indicators. These selections are enhanced with the ability of the electric motor to detect the input voltage to the electric motor and to identify an output speed for the electric motor with reference to the detected input voltage.

Figure 1:
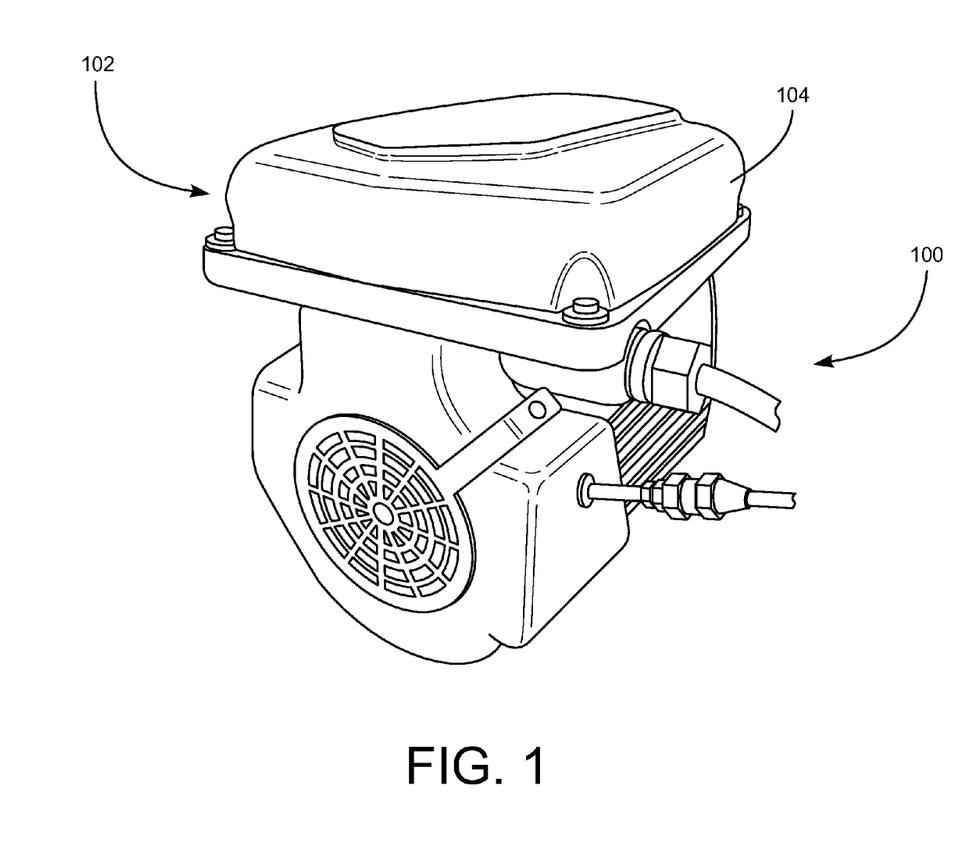
FIG. 1 is an elevational view of an electric motor with a control circuit as described in this document.

Referring to FIG. 1, an electric motor 100, such as a three phase AC induction motor, includes a control module 102 having a housing 104. The control module 102 includes a microcontroller receiving a plurality of inputs for controlling the operation, including the speed, of the motor 100. The microcontroller is operatively connected to a circuit as described below to detect the input voltage to the motor 100 and select a range of operation for the output speed of the motor.

In various embodiments, the electric motor 100 may be an AC or DC motor, including AC induction, Permanent Magnet AC, Brushless DC, Switched Reluctance, among other types of electric motors. In embodiments, the motor may be employed in a fluid pump (e.g., pool pump), gas pump or air pump application. Other applications include the motor being used in HVAC, fan, food processor, or floor care equipment, as well as in various other applications. Those skilled in the art appreciate that the foregoing motor types and motor applications are merely exemplary and that the motor type and its application are not limited to those described herein.

Figure 2:
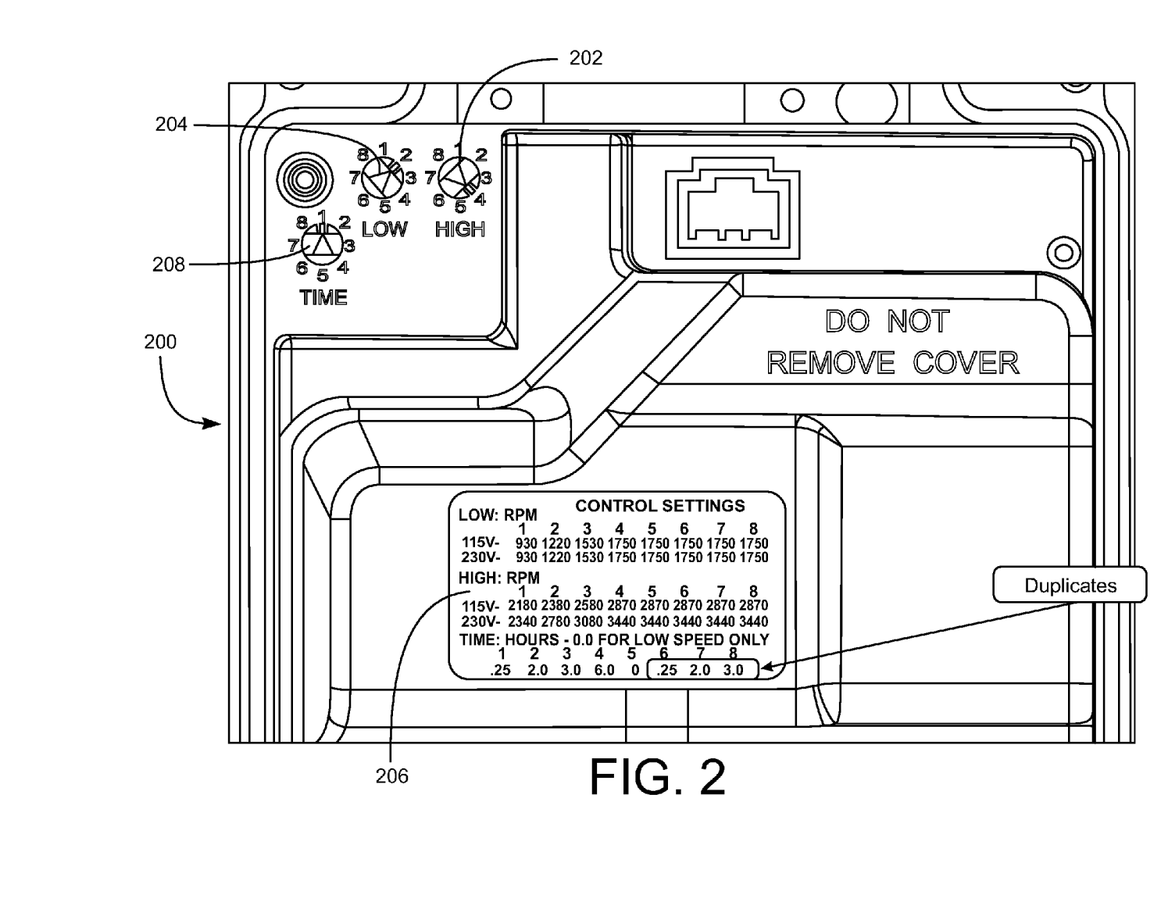
FIG. 2 is a depiction of a control panel for the control circuit.
Figure 7:
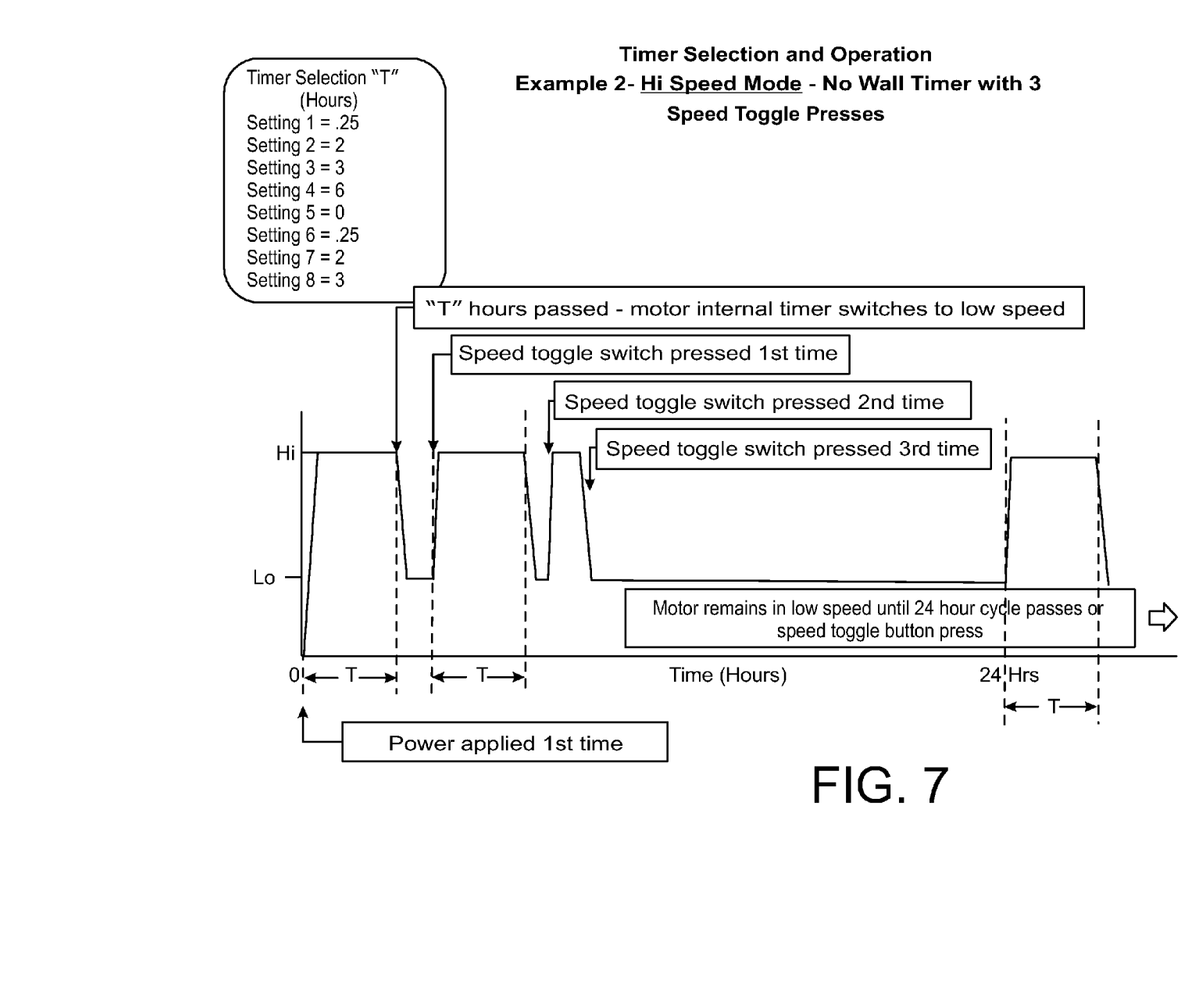
FIG. 7 is a diagram of another example of electric motor speed operation with the control circuit.
Figure 8:
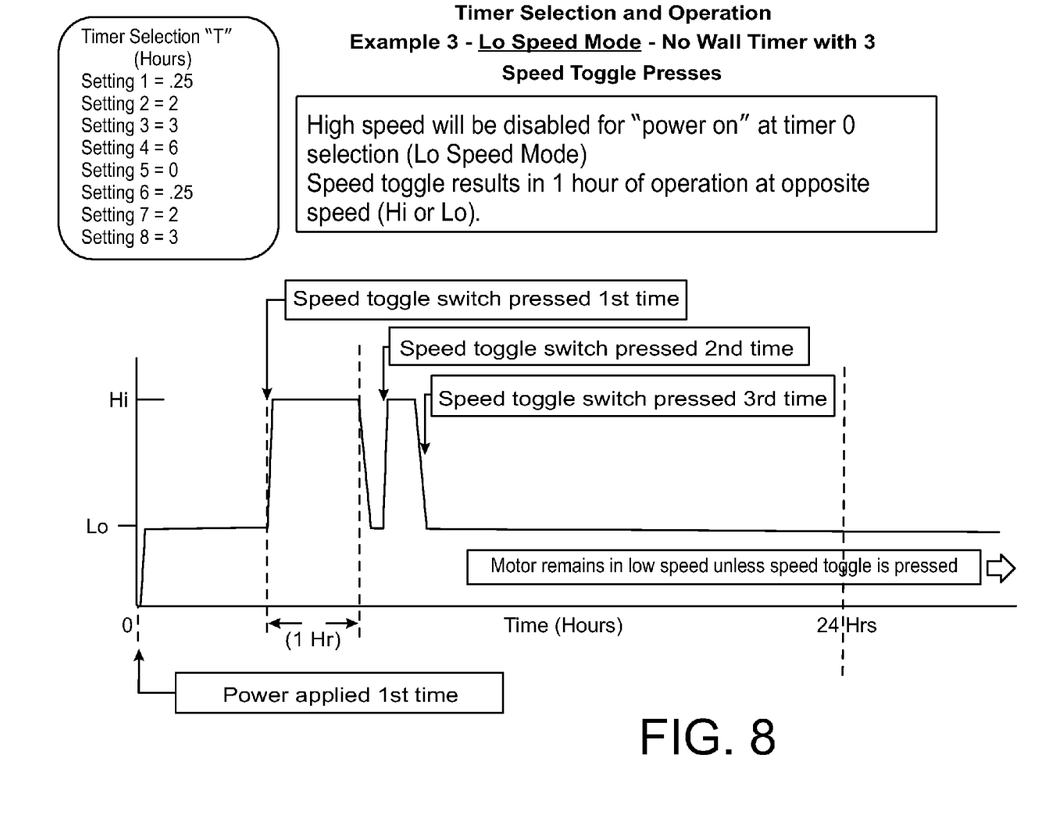
FIG. 8 is a diagram of another example of electric motor speed operation with the control circuit.
Figure 9:
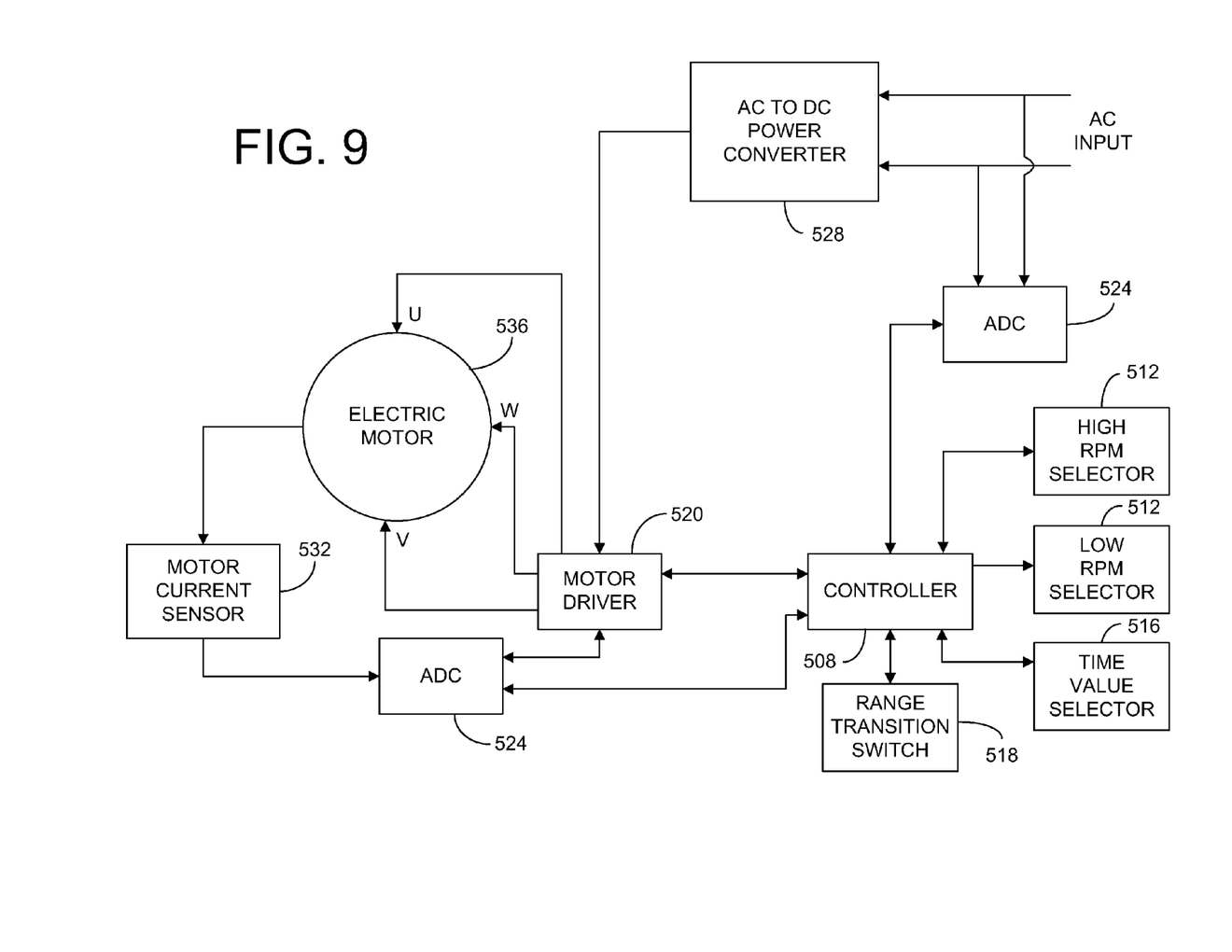
FIG. 9 is a block diagram of the control circuit.

FIG. 2 depicts a control panel 200, which in this example is located under the control module housing 104 shown in FIG. 1. The control panel 200 further includes speed selection controls, such as rotary dials 202, 204, which correspond respectively to high and low RPM settings, and time control 208, which is also depicted as a rotary dial 208. In particular, each speed selector identifies a speed setting from a plurality of speed settings that correspond to predetermined RPM values for the output shaft of the electric motor. In alternate embodiments, the speed selection and/or timer controls 202-208 are implemented with pushbutton or other interface hardware for accepting user input. In the illustrated embodiment, the high speed dial 202 includes eight settings corresponding to eight "high" RPM values. Similarly, the low speed dial 204 includes eight settings corresponding to eight "low" RPM values. Each of the "high" RPM values selectable via the high speed dial 202 is higher than each of the "low" speed RPM values selectable via the low speed dial 204. Additionally, as shown in the exemplary control settings table 206, each of the low and high RPM control settings includes different speed maps corresponding to particular input voltages. For instance, each of the high and low RPM settings includes separate speed maps for 115 VAC and 230 VAC input voltage. Although in the illustrated embodiment, speed settings 5-8 for both input voltages are the same value for the corresponding input voltage identified with the speed setting number 4, other embodiments include distinct RPM speeds for each of the speed settings, such as consecutively increasing RPM values for all speed settings. Additionally, as those skilled in the art realize, a control panel in other embodiments can be configured with a different number of speed settings than shown in the figure and the relationship among the speed settings can vary as well. The control circuit for the motor 100 can also include a speed control toggle switch, as shown in FIG. 9, which immediately toggles the selected speed range to the other speed range selected with the corresponding speed controls 202, 204. Examples of the effect of toggle switch on operation of the electric motor are shown in FIG. 7 and FIG. 8.

The timer control of motor 100, such as a timer dial 208, selects one of a plurality of timer values for switching between the high and low speed settings, as shown in the control settings table 206, for example. In the illustrated embodiment, if the user selects the timer value 5, the motor operates in accordance with a currently selected RPM setting, high or low, without switching to the alternative speed setting since the corresponding timer value for timer setting 5 is zero in this example. That is, the timer values correspond to the duration of time the motor operates under the pre-selected high RPM setting before changing to the other RPM setting.

Figure 3:
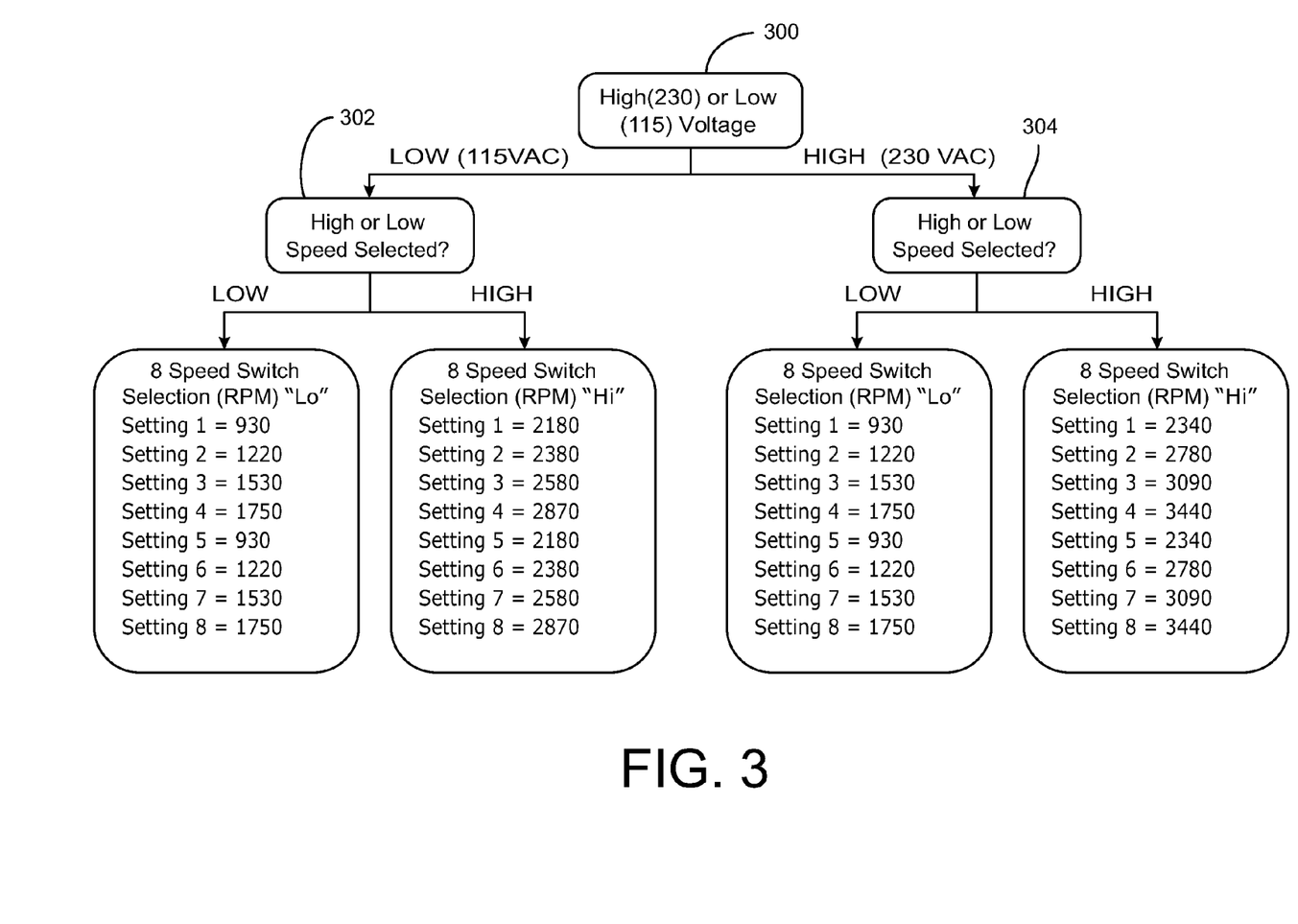
FIG. 3 is a decision tree for selecting a speed for the electric motor.

Referring to FIG. 3, a decision tree for the control circuit controlling a speed of an electric motor is shown. The process 300 begins with the controller of the motor 100 detecting whether high or low input voltage is being supplied to the motor (block 304). If the controller detects a low input voltage (e.g., 115 VAC), then high and low speed maps corresponding to the low input voltage are activated. Then the controller determines whether to activate the high or low speed map with reference to the value selected by the timer setting. For example, in the embodiment discussed above, the high speed map is activated for all timer setting values except for setting 5, in which case, the motor begins in the low speed range. A speed value from the activated map is then selected with reference to the value in the dial 202 or 204 corresponding to the activated map (block 308) (e.g., based on timer expiration, toggle switch input, or motor power up event). If the controller detects a high input voltage being supplied to the motor (e.g., 230 VAC), then high and low speed maps corresponding to the high input voltage are activated (block 312). The controller then determines whether to activate the low or high speed map with reference to the timer value and then selects a speed value with reference to the value selected by the dial 202 or 204 corresponding to the activated map.

Figures 4, 5:
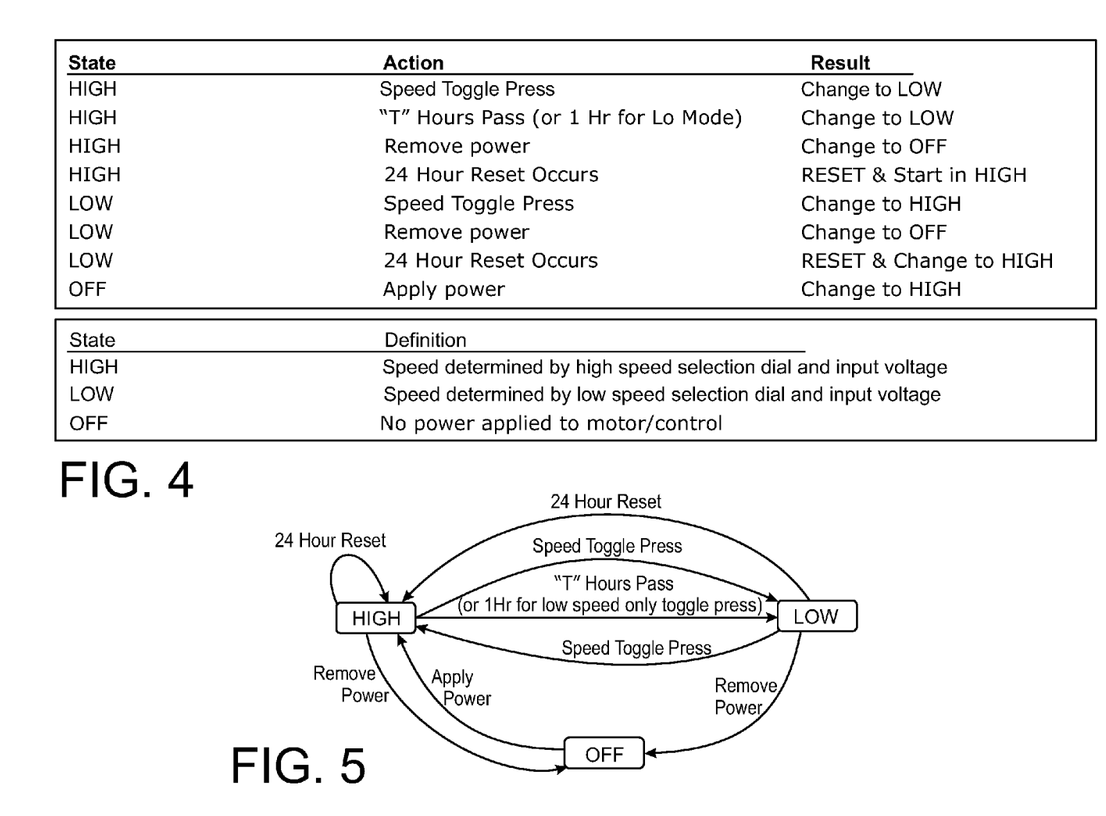
FIG. 4 is a state table for a control circuit embodiment.
FIG. 5 is a state diagram for the state table of FIG. 4.

FIG. 4 and FIG. 5 depict a state table (FIG. 4) and a corresponding state diagram (FIG. 5) for the operation of the motor 100. As shown in FIG. 5, when electrical power is applied, the motor initiates operation in the high RPM speed state and references the speed setting indicated on the high speed dial 202 and the input voltage to the motor to determine the speed at which to operate the motor 100. Upon expiration of timer value "T" hours selected by the timer indicator 208, the controller directs the motor to switch to the RPM setting of the motor to the low speed value that corresponds to the input voltage. Alternatively, when the user activates the speed toggle switch, the controller directs the motor to toggle from the currently selected RPM speed to the unselected RPM speed setting. In one embodiment, when toggling from one speed selection to the other speed selection, the motor reverts back to the first speed selection upon expiration of a predetermined time period. In response to the input voltage to the motor being deactivated, the motor enters the "off" state. In the embodiment depicted in FIG. 4 and FIG. 5, the controller operates the motor in the "high" speed state in response to electrical power being applied to the motor; however, those skilled in the art realize that the motor may start in the low speed setting instead of the high speed setting depending upon the application in which the motor is being used.

A block diagram of the selectable electric motor speed system is shown in FIG. 9. The system 504 includes a controller 508, two speed selectors 512, a time selector 516, a speed range transition switch 518, an electric motor driver 520, at least a pair of analog-to-digital converters (ADC) 524, an AC to DC power converter 528, and a motor current sensor 532. The controller 504 is operatively connected to at least one of the ADCs 524, the three selectors 512, 516, and the motor driver 520. One of the ADCs is operatively connected to the AC electrical power input to enable the ADC to generate digital data corresponding to the magnitude of the AC electrical power being input to the system 504. These digital data are provided to the controller 508. Controller 508 also receives digital data from the two motor speed selectors 512. These motor speed selectors can be, for example, a switch with three binary outputs. For example, the switch can be an eight position rotary switch or a three rocker switch. Such a switch would be capable of generating a three bit digital word having a value of zero to seven to represent the eight speed settings for either the high speed or the low speed selection as shown in FIG. 2. Similarly, time selector 516 can be a switch with three binary outputs to represent the eight time values that can be selected for the low speed range as shown in FIG. 2. Speed range selector 518 can be a binary switch to identify the high speed or the low speed operation of the motor when the system is initially started or to change the speed range in which the motor runs. With the data from the selectors and the ADC, the controller 508 can identify the voltage range that the controller selects for the high or low speed range identified by the range selector switch.

The AC electrical power is converted to DC power by the converter 528 to operate the electric motor and to power the electronics in the system 504. Such a converter can include a full wave rectifier and appropriate step down transformers to provide the appropriate DC voltages for operation of the electronics. The converted electrical power is provided to the electric motor driver 520. The electric motor driver 520 includes an H-bridge circuit for selectively coupling the electrical leads of the electric motor 536 to the converted electrical power. In one embodiment, the electric motor driver is a STGIPL14K60 available from ST Microelectronics of Geneva, Switzerland. The converted electrical power provided by the internal H-bridge circuit of the driver 520 to the windings of the electric motor 536 are designated by the letters U, V, and W in the figure. The controller 508 generates and transmits digital data identifying the speed at which the motor is to be operated to the electric motor driver 520, which generates the waveforms needed to operate the electric motor at the targeted speed for the input voltage as determined by the controller 508 from the selector switches and the sampling of the input power. The range transition switch 518 generates and sends a signal to the controller in response to an operator manipulating the switch. The signal from the switch 518 indicates the current speed range is to change to currently inactive speed range. In response to that signal, the controller 508 transmits data to the motor driver 520 to operate the electric motor at the speed identified by the selector switch corresponding to the inactive speed range.

The electric motor driver 520 generates pulse modulated signals to operate the internal H-bridge circuit. The motor current sensor 532 is configured to measure the magnitude of the current in the winding(s) of the electric motor 536 currently being coupled to the converted electrical power by the electric motor driver 520. In one embodiment, the motor current sensor is a resistor through which a portion of the current through the winding is dropped and the voltage across the resistor is converted by the ADC 524 to provide digital data to the electric motor driver 520. These data are feedback data to the electric motor driver 520 to enable the driver to determine whether the modulated pulses generated by the driver require adjustment.

Figure 6:
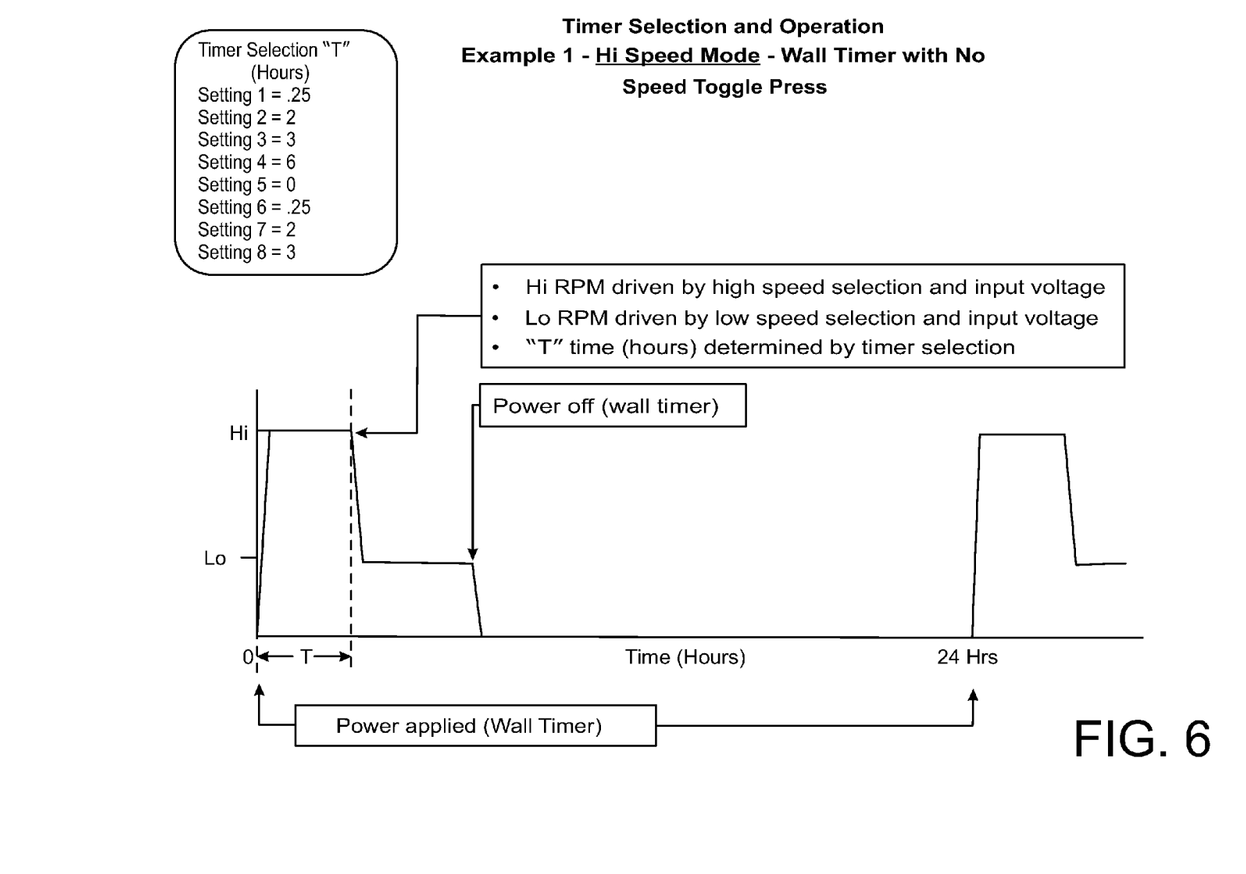
FIG. 6 is a diagram of one example of electric motor speed operation with the control circuit.

FIG. 6, FIG. 7, and FIG. 8 illustrate several examples of speed motor operation. In particular, FIG. 6 illustrates an exemplary scenario where, in addition to the internal timer that governs high/low speed operation of the motor, an external wall timer is employed to supply or remove input power to the electric motor. Therefore, in the illustrated example, the motor operates at high speed/RPM for the duration "T" corresponding to the selection of the timer dial 208. As discussed above, the controller automatically detects the input voltage upon motor startup and determines whether to activate a high input voltage or low input voltage speed map (each with corresponding high and low speeds, as shown in FIG. 2). Upon expiration of the timer "T," the motor operates in accordance with the low speed dial selection until the input power is removed by the external timer (e.g., wall timer). When the input power is re-applied by the wall timer, the process repeats with the motor again initiating operation in the high speed state for duration "T" and subsequently operating under a low speed setting for the duration of the wall timer.

Similarly, FIG. 7 illustrates an operational scenario where the motor initiates operation in the high speed state and switches to the low speed state upon expiration of internal timer selection "T." In this example, no wall timer is used and the input power is continuously applied to the motor, until a pre-set amount of time has passed. Upon expiration of the pre-set time amount, the unit resets and repeats the cycle. In this illustration, the pre-set amount of time is set at 24 hours; however, those skilled in the art realize that the pre-set time could be programmed as the specific application in which the motor is being used demands. Upon activation of the speed toggle switch by the user, the controller causes the motor speed to toggle between high and low speed operation. As shown in FIG. 7, when the speed toggle switch was last activated while the motor was operating in the high speed mode, the motor switches to the low speed mode and remains in the low speed mode unless the toggle switch is activated again.

In the examples illustrated in FIG. 6 and FIG. 7, when the timer dial 208 is set to zero, the motor operates according to the low speed dial selection only, except when the speed toggle button is activated. In an embodiment illustrated in FIG. 8, when the speed toggle button is activated with the timer dial 208 set to zero, the motor operates at the speed identified by the high speed dial for a pre-programmed amount of time (e.g., one hour as shown in the example). When the timer dial 208 is set to zero, the motor speed is controlled only via the speed toggle switch until power is removed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

For instance, each speed dial may be numbered with numerical settings 1 through 8, where higher numbers correspond to higher revolutions-per-minute (RPM). Thus, in the above example, a Low Speed dial with eight settings can have eight manually selectable low RPM settings and a High Speed dial with eight settings can have eight manually selectable high RPM settings. In an embodiment, separate low and high speed settings can correspond to a given input voltage. In the preferred embodiment, the low input voltage speed settings are controlled by the high input voltage switches. In either case, the input voltage is detected by the variable speed control which then determines the required speed. As further explained below, a motor controller detects an input voltage level and selects a speed setting in the corresponding low and high speed maps for either the 115 VAC or 230 VAC input voltage.

To provide further control, a speed toggle switch, which may be located on the motor housing or on a motor control module, allows the user to toggle between high and low speed operation manually. The motor housing or a motor control module includes a timer selection dial having multiple timer duration settings. In an embodiment, the motor may have a default High or Low speed RPM setting that is used at startup. For example, in a pool pump motor application, an installer may set up the motor to start at one of the eight High Speed settings and then automatically switch to one of the eight Low Speed settings after a preset timer expiration interval.

What is claimed:

1. A control circuit for an electric motor comprising:
a voltage sensor configured to identify an input voltage for operating an electric motor;
a first selector configured to generate a first electrical signal that identifies a first speed for a first input voltage and a second speed for a second input voltage from a first range of speeds for operation of the electric motor;
a second selector configured to generate a second electrical signal that identifies a third speed for the first input voltage and a fourth speed for the second input voltage from a second range of speeds for operation of the electric motor, each speed in the second range of speeds being greater than each speed in the first range of speeds;
a motor driver circuit configured to generate waveforms to regulate the speed of the electrical motor; and
a controller operatively connected to the first selector, the second selector, the voltage sensor, and the motor driver circuit, the controller being configured to select one of the first speed, the second speed, the third speed, and the fourth speed for operation of the electrical motor with reference to the identified input voltage, and to transmit data to the motor driver circuit that identifies the selected speed for the operation of the electric motor.

2. The control circuit of claim 1, the controller being further configured to select the speed for operation of the electric motor from the third speed and the fourth speed with reference to the identified input voltage.

3. The control circuit of claim 1, the controller being further configured to select the speed for operation of the electric motor from the first speed and the second speed with reference to the identified input voltage.

4. The control circuit of claim 1 further comprising:
a switch configured to generate a signal in response to manipulation of the switch; and
the controller being operatively connected to the switch to transmit data to the motor driver circuit that identifies a speed in the first range of speeds for operation of the electric motor in response to the selected speed being in the second range of speeds and that identifies a speed in the second range of speeds for operation of the electric motor in response to the selected speed being in the first range of speeds.

5. The control circuit of claim 2 further comprising:
a third selector configured to identify a time period for operating the electric motor at the selected speed.

6. The control circuit of claim 5, the controller being further configured to select one of the first speed and the second speed in response to expiration of the time period identified by the third selector, and to transmit data to the motor driver circuit identifying the selected first speed or second speed to enable the motor driver circuit to change the speed of operation for the electric motor.

7. The control circuit of claim 3 further comprising:
a third selector configured to identify a time period for operating the electric motor at the selected speed.

8. The control circuit of claim 7, the controller being further configured to select one of the third speed and the fourth speed in response to expiration of the time period identified by the third selector, and to transmit data to the motor driver circuit identifying the selected third speed or fourth speed to enable the motor driver circuit to change the speed of operation for the electric motor.

9. A selectable speed electric motor system comprising:
an electric motor;
a housing mounted to the electric motor; and
a control circuit within the housing, the control circuit being configured to regulate a speed of the electric motor and the control circuit comprising:
a voltage sensor configured to identify an input voltage for operating an electric motor;
a first selector configured to generate a first electrical signal that identifies a first speed for a first input voltage and a second speed for a second input voltage from a first range of speeds for operation of the electric motor;
a second selector configured to generate a second electrical signal that identifies a third speed for the first input voltage and a fourth speed for the second input voltage from a second range of speeds for operation of the electric motor, each speed in the second range of speeds being greater than each speed in the first range of speeds;
a motor driver circuit configured to generate waveforms to regulate the speed of the electrical motor; and
a controller operatively connected to the first selector, the second selector, the voltage sensor, and the motor driver circuit, the controller being configured to select one of the first speed, the second speed, the third speed, and the fourth speed for operation of the electrical motor with reference to the identified input voltage, and to transmit data to the motor driver circuit that identifies the selected speed for the operation of the electric motor.

10. The system of claim 9, the controller of the control circuit being further configured to select the speed for operation of the electric motor from the third speed and the fourth speed with reference to the identified input voltage.

11. The system of claim 9, the controller of the control system being further configured to select the speed for operation of the electric motor from the first speed and the second speed with reference to the identified input voltage.

12. The system of claim 9, the control circuit further comprising:
a switch configured to generate a signal in response to manipulation of the switch; and
the controller being operatively connected to the switch to transmit data to the motor driver circuit that identifies a speed in the first range of speeds for operation of the electric motor in response to the selected speed being in the second range of speeds and that identifies a speed in the second range of speeds for operation of the electric motor in response to the selected speed being in the first range of speeds.

13. The system of claim 11, the control circuit further comprising:
a third selector configured to identify a time period for operating the electric motor at the selected speed.

14. The system of claim 13, the controller of the control circuit being further configured to select one of the first speed and the second speed in response to expiration of the time period identified by the third selector, and to transmit data to the motor driver circuit identifying the selected first speed or second speed to enable the motor driver circuit to change the speed of operation for the electric motor.

15. The system of claim 11, the control circuit further comprising:
   a third selector configured to identify a time period for operating the electric motor at the selected speed.

16. The system of claim 15, the controller of the control circuit being further configured to select one of the third speed and the fourth speed in response to expiration of the time period identified by the third selector, and to transmit data to the motor driver circuit identifying the selected third speed or fourth speed to enable the motor driver circuit to change the speed of operation for the electric motor.

* * * * *